US012562761B2

(12) United States Patent 
Hsu et al.

(10) Patent No.: US 12,562,761 B2 
(45) Date of Patent: Feb. 24, 2026

(54) POWER AMPLIFIER AND RADIO FREQUENCY FRONT-END CIRCUIT

(71) Applicant: National Yang Ming Chiao Tung University, Hsinchu (TW)

(72) Inventors: Heng-Tung Hsu, Taichung (TW); Yi-Fan Tsao, Hsinchu County (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 711 days.

(21) Appl. No.: 18/050,471

(22) Filed: Oct. 28, 2022

(65) Prior Publication Data

US 2024/0048164 A1 Feb. 8, 2024

(30) Foreign Application Priority Data

Aug. 2, 2022 (TW) .................................. 111129007

(51) Int. Cl. 
    *H04B 1/04*     (2006.01) 
    *H04B 1/00*     (2006.01)

(52) U.S. Cl. 
    CPC ............. *H04B 1/04* (2013.01); *H04B 1/0071* (2013.01); *H04B 2001/0408* (2013.01)

(58) Field of Classification Search 
    None 
    See application file for complete search history.

(56) References Cited

U.S. PATENT DOCUMENTS

| | | | |
|---|---|---|---|
| 7,656,228 B2 | 2/2010 | Fukuda et al. | |
| 8,576,010 B2 | 11/2013 | Yanduru et al. | |

| | | | |
|---|---|---|---|
| 8,644,198 B2 | 2/2014 | Khlat et al. | |
| 9,160,377 B2 | 10/2015 | Lee et al. | |

(Continued)

FOREIGN PATENT DOCUMENTS

| | | |
|---|---|---|
| CN | 110120790 A | 8/2019 |
| TW | 201316677 A | 4/2013 |
| TW | I647921 B | 1/2019 |

OTHER PUBLICATIONS

Cuong Huynh et al., "New Technique for Synthesizing Concurrent Dual-Band Impedance-Matching Filtering Networks and 0.18-μm SiGe BiCMOS 25.5/37-GHz Concurrent Dual-Band Power Amplifier", IEEE Transactions on Microwave Theory and Techniques, vol. 61, No. 11, Nov. 2013, pp. 3927-3939.

(Continued)

*Primary Examiner* — Andrea Lindgren Baltzell 
*Assistant Examiner* — Malane Lieng 
(74) *Attorney, Agent, or Firm* — CKC & Partners Co., LLC

(57) ABSTRACT

A power amplifier includes an amplifying circuit, a feedback circuit and a grounding capacitor. The amplifier circuit includes at least a first transistor and a second transistor. A control terminal of the first transistor is configured to receive an input signal, a first terminal of the second transistor is coupled to the first transistor, and a second terminal of the second transistor is configured to generate an output signal. The feedback circuit is coupled to the control terminal of the first transistor and the second terminal of the second transistor. The ground capacitor is configured to couple the control terminal of the second transistor to ground. When a frequency of the input signal is between a first band and a second band, an amplification gain of the output signal relative to the input signal is substantially the same.

15 Claims, 8 Drawing Sheets

100

(56) References Cited

U.S. PATENT DOCUMENTS

| | | | |
|---|---|---|---|
| 9,319,005 | B2 | 4/2016 | Scott et al. |
| 10,630,321 | B2 | 4/2020 | Desclos et al. |
| 10,886,953 | B2 | 1/2021 | Feng et al. |
| 2005/0233714 | A1 | 10/2005 | Kajiwara et al. |
| 2021/0320640 | A1* | 10/2021 | Seong ........................ H01P 5/12 |

OTHER PUBLICATIONS

Xin Fu et al., "Novel Dual-Band Matching Network for Effective Design of Concurrent Dual-Band Power Amplifiers", IEEE Transactions on Circuits and Systems-I: Regular Papers, vol. 61, No. 1, Jan. 2014, pp. 293-301.

Song Hu et al., "A 28-/37-/39-GHz Linear Doherty Power Amplifier in Silicon for 5G Applications", IEEE Journal of Solid-State Circuits, vol. 54, No. 6, Jun. 2019, pp. 1586-1599.

Hongqi Tao et al., "High-Power Ka/Ku Dual-Wideband GaN Power Amplifier With High Input Isolation and Transformer-Combined Load Design", IEEE Microwave and Wireless Components Letters, vol. 31, No. 1, Jan. 2021, pp. 49-51.

Zhiwei Zhang et al., "Design of a Dual-Band Power Amplifier Using a Simple Method", IEEE Microwave and Wireless Components Letters, vol. 31, No. 2, Feb. 2021, pp. 149-152.

Kaijie Ding et al., "A 28/38 GHz Dual-Band Power Amplifier for 5G Communication", IEEE Transactions on Microwave Theory and Techniques, vol. 70, No. 9, Jan. 10, 2022.

Yi-Fan Tsao et al., "Dual-Band Power Amplifier Design at 28/38 GHz for 5G New Radio Applications", IEEE Access, vol. 10, Jul. 25, 2022.

* cited by examiner

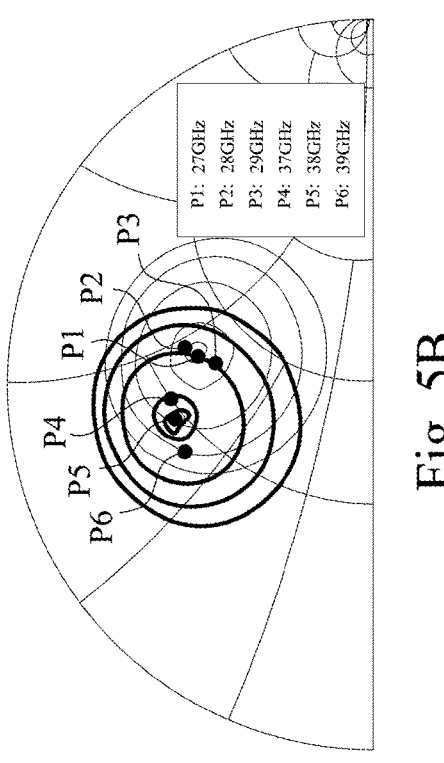
Fig. 5A
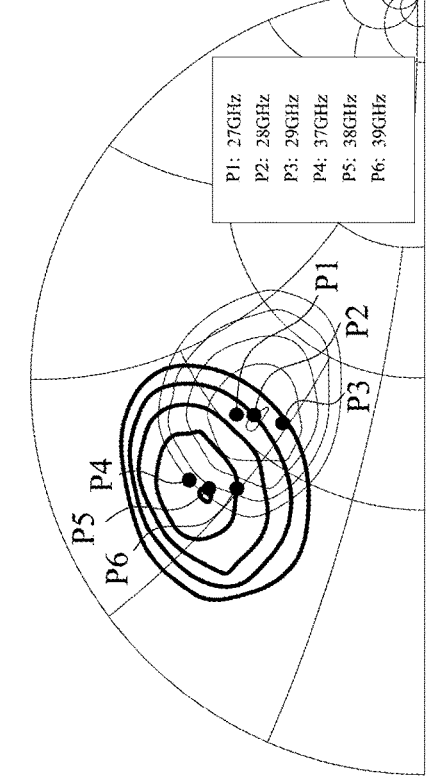
Fig. 5B
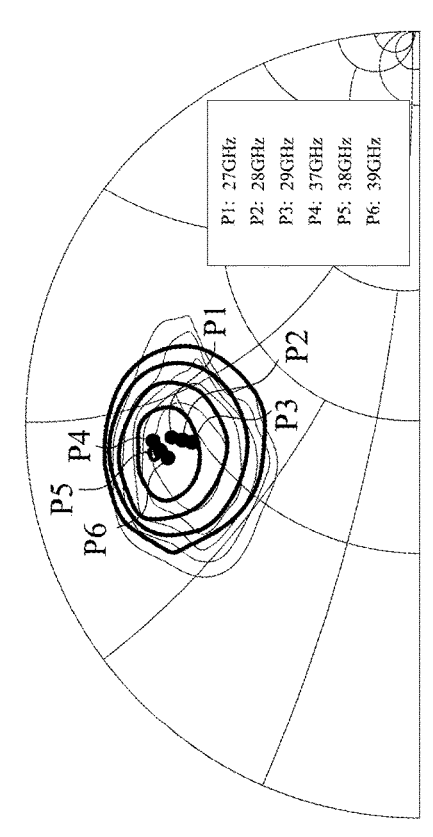
Fig. 5C
Fig. 5D

POWER AMPLIFIER AND RADIO FREQUENCY FRONT-END CIRCUIT

CROSS-REFERENCE TO RELATED APPLICATION

This application claims priority to Taiwan Application Serial Number 111129007, filed Aug. 2, 2022, which is herein incorporated by reference in its entirety.

BACKGROUND

Technical Field

The present disclosure relates to a circuit for amplifying a signal, particularly a power amplifier or a radio frequency front-end circuit.

Description of Related Art

With the evolution of semiconductor technology in recent years, the operating frequency range of communication systems has gradually developed to higher frequency bands, such as millimeter wave (mmWave) or terahertz (THz). Accordingly, the operating frequency of the power amplifier configured to process the signal also needs to be increased. However, in high frequency operation, "maximum available gain (MAG)" of semiconductor device will decline sharply as the operating frequency increases, making it difficult to achieve the expected signal amplification.

SUMMARY

One aspect of the present disclosure is a power amplifier, comprising an amplifying circuit, a feedback circuit and a grounding capacitor. The amplifying circuit at least comprises a first transistor and a second transistor. A control terminal of the first transistor is configured to receive an input signal, a first terminal of the second transistor is coupled to the first transistor, and a second terminal of the second transistor is configured to generate an output signal. The feedback circuit is coupled to the control terminal of the first transistor and the second terminal of the second transistor. The grounding capacitor is configured to couple a control terminal of the second transistor to a ground terminal. When a frequency of the input signal is between a first band and a second band, an amplification gain of the output signal relative to the input signal is substantially the same.

Another aspect of the present disclosure is a power amplifier, comprising an amplifying circuit, a feedback circuit and a grounding capacitor. The amplifying circuit at least comprises a first transistor and a second transistor. A control terminal of the first transistor is configured to receive a input signal, a first terminal of the second transistor is coupled to the first transistor, and a second terminal of the second transistor is configured to generate a output signal. The feedback circuit is coupled to the control terminal of the first transistor and the second terminal of the second transistor. The grounding capacitor is configured to couple the second transistor, the feedback circuit and a ground terminal. When a frequency of the input signal is between a first band and a second band, an amplification gain of the output signal relative to the input signal is substantially the same.

Another aspect of the present disclosure is a radio frequency front-end circuit, comprising a power amplifier and an impedance matching circuit. The power amplifier comprises an amplifying circuit, a feedback circuit and a grounding capacitor. The amplifying circuit at least comprises a first transistor and a second transistor. A control terminal of the first transistor is configured to receive an input signal, a first terminal of the second transistor is coupled to the first transistor, and a second terminal of the second transistor is configured to generate an output signal. The feedback circuit is coupled to the control terminal of the first transistor and the second terminal of the second transistor. The grounding capacitor is configured to couple a control terminal of the second transistor to a ground terminal. When a frequency of the input signal is between a first band and a second band, an amplification gain of the output signal relative to the input signal is substantially the same. The impedance matching circuit is coupled to the power amplifier, and configured to transmit an input signal to the amplifying circuit. An output impedance of the impedance matching circuit is substantially the same as an input impedance of the power amplifier.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIGS. 5A-5D are schematic diagrams of the optimal output impedances of the power amplifier for maximum output power at different frequencies in some embodiments of the present disclosure.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
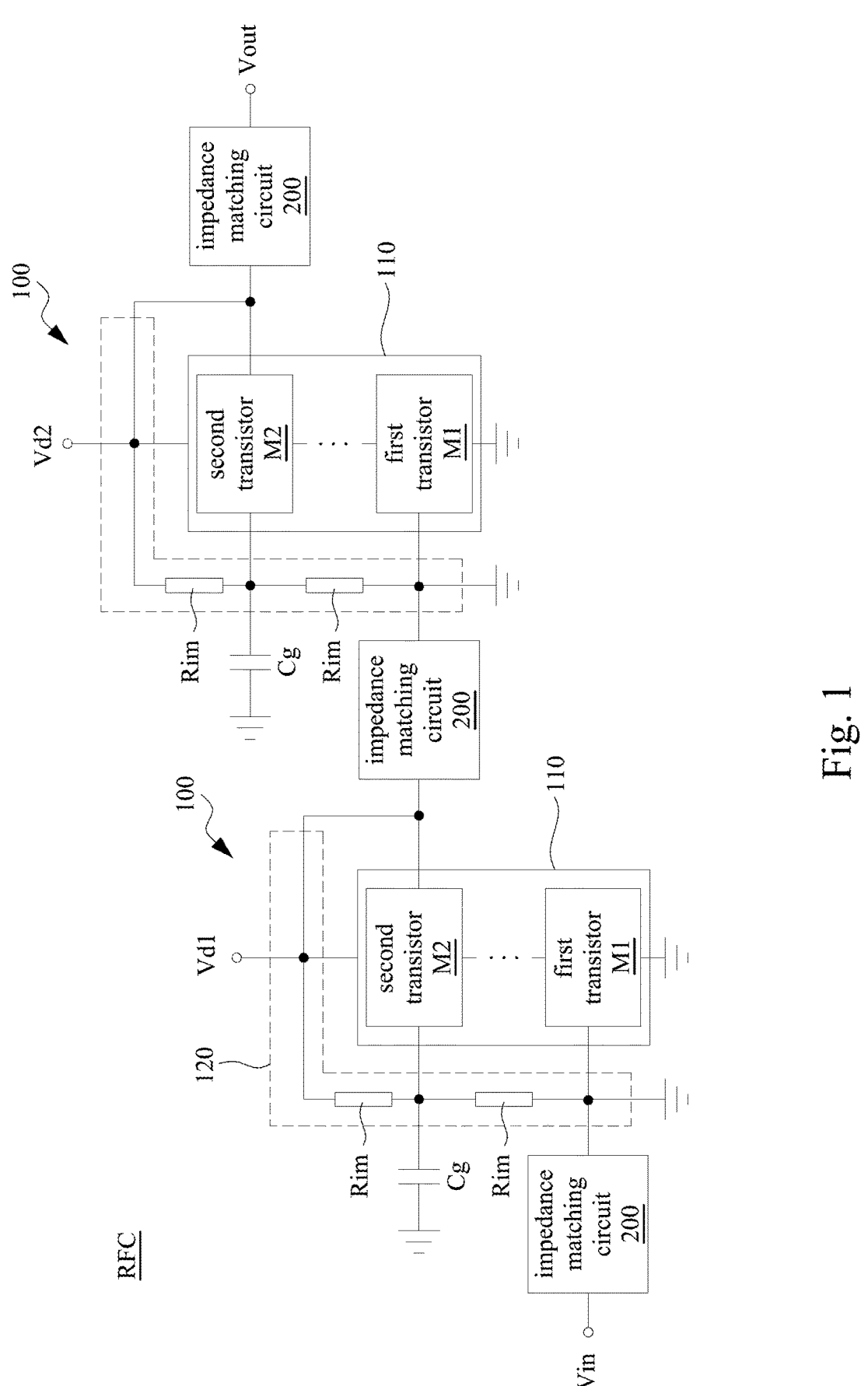
FIG. 1 is a schematic diagram of a power amplifier and a radio frequency front-end circuit in some embodiments of the present disclosure.

FIG. 1 is a schematic diagram of a power amplifier 100 in some embodiments of the present disclosure. In one embodiment, the power amplifier 100 is implemented to a radio frequency front-end circuit RFC. As shown in figure, the radio frequency front-end circuit RFC includes at least one power amplifier 100 and at least one impedance matching circuit 200, and is configured to receive and amplify a radio frequency signal. In some embodiments, the power amplifier further includes a radio frequency switch to switch the receive/transmit channel, and a filter to filter the transmit and receive signals.

As shown in figure, the radio frequency front-end circuit RFC includes multiple power amplifiers to increase amplification gain. The impedance matching circuit 200 is arranged on an input terminal and an output terminal, and is configured to adjust the input impedance and the output impedance of the power amplifier 100. The power amplifier 100 of the present disclosure is not limited to be applied to the radio frequency front-end circuit RFC, and can also be applied to other types of circuits.

The power amplifier 100 includes an amplifying circuit 110, a feedback circuit 120 and a grounding capacitor Cg. The amplifying circuit 110 includes multiple transistors T1, T2. In some embodiments, the transistors M1, M2 are connected in cascade. For example, the transistor M1 is a common source structure and is configured to receive an input signal Vin from the control terminal (gate) and output signal to the transistor M2. The transistor M2 is a common gate structure, the first terminal (source) of the transistor M2 receives the signal output by the transistor M1, and the second terminal (drain) generates an amplified output signal Vout.

The feedback circuit 120 is coupled to the output terminal of the transistor M2 and the control terminal (the input terminal) of the transistor M1. The feedback circuit 120 is configured to form a feedback path. The feedback circuit 120 includes multiple impedance elements Rim, impedance elements Rim are coupled to power supply Vd1 (or power supply Vd2). Based on the output signal of the transistor M2 and dividing the power supplies Vd1/Vd2 by the impedance elements Rim, the feedback circuit 120 is configured to adjust voltage value of the control terminal of the transistor M1, and/or adjust voltage value of the control terminal of the transistor M2.

The grounding capacitor Cg is coupled between the control terminal of the transistor M2 and a ground terminal (or a reference voltage), and is configured to increase a pole frequency of the power amplifier 100 in high frequency response characteristic, and reduce the gain decline of the power amplifier 100 at high frequencies. In some embodiments, the grounding capacitor Cg can also be coupled to the feedback circuit 120. The internal circuit of the power amplifier 100 and high frequency response characteristics of the power amplifier 100 will be described in detail in the following paragraphs.

In some embodiments, the radio frequency front-end circuit RFC is configured to receive/transmit wireless signals in different frequency bands, such as signals transmitted by carrier aggregation technology. In some embodiments, the signals of different frequency bands correspond to different devices, or correspond to different transmission protocols. The power amplifier 100 amplifies the input signal Vin in different frequency bands, and outputs the amplified signal as an output signal Vout. When the frequency of the input signal is in the first band (e.g., 15-25 GHz) or in the second band (e.g., 35-45 GHz), the amplification gain/gain ratio (i.e., the amplification ratio of the output signal relative to the input signal) is substantially the same, so that the bandwidth of the power amplifier 100 wider and the gain of the power amplifier 100 to remain stable. The above "substantially the same" means that when the power amplifier processes signals at different frequencies, the difference between multiple gains will not exceed a predetermined range (e.g., the not exceed 10%). In some other embodiments, the power amplifier 100 can be implemented as a dual-frequency or multi-frequency signal amplifying circuit.

As shown in FIG. 1, when the traditional dual-frequency amplifier processes signals of different frequency bands, the characteristics such as gain and output power are too different, so that it cannot be used in a communication technology for integrating different frequency bands. The present disclosure changes the pole frequency of the amplifying circuit and reduces the gain decline at high frequencies by setting the grounding capacitor Cg at the control terminal of the amplifying circuit. Accordingly, signals at different frequencies can be amplified with the same gain to achieve a "broadband" amplification effect.

Figure 2A:
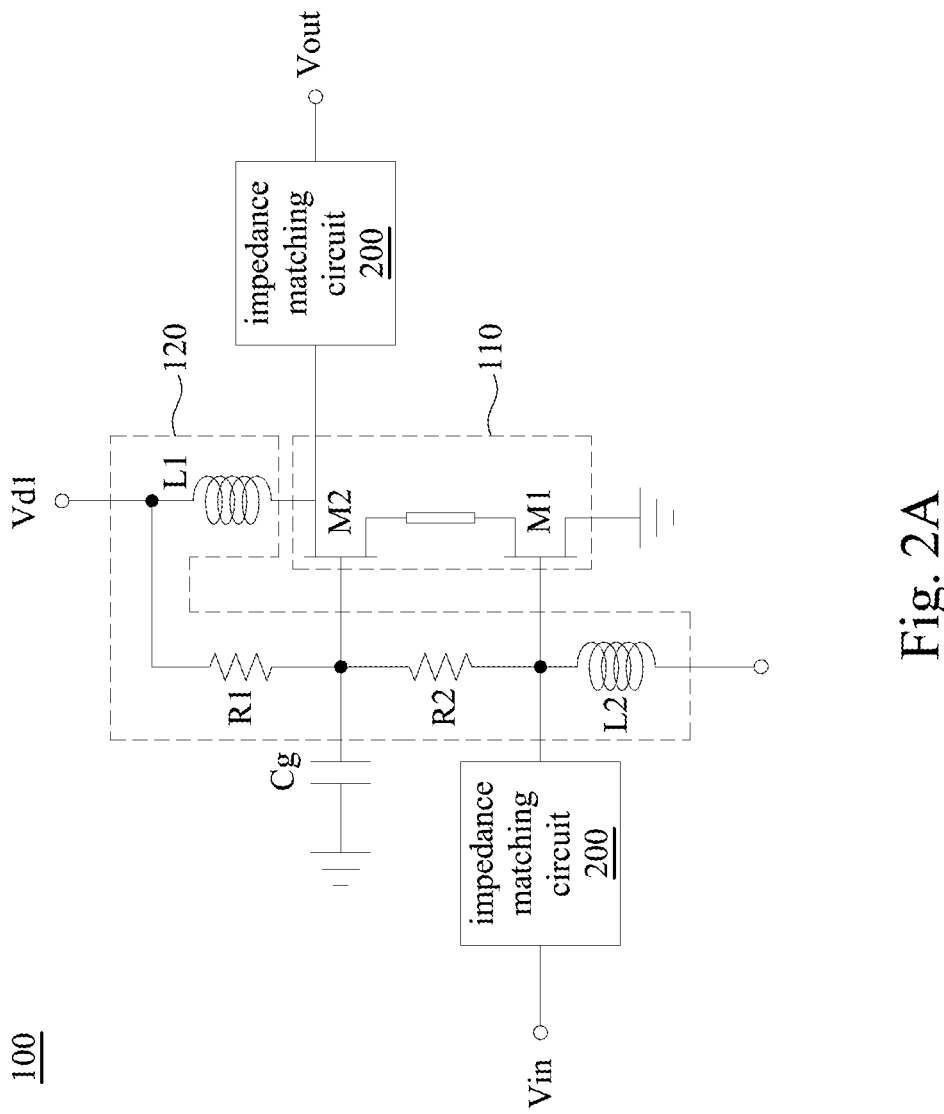
FIG. 2A is a schematic diagram of the power amplifier in some embodiments of the present disclosure.
Figure 2B:
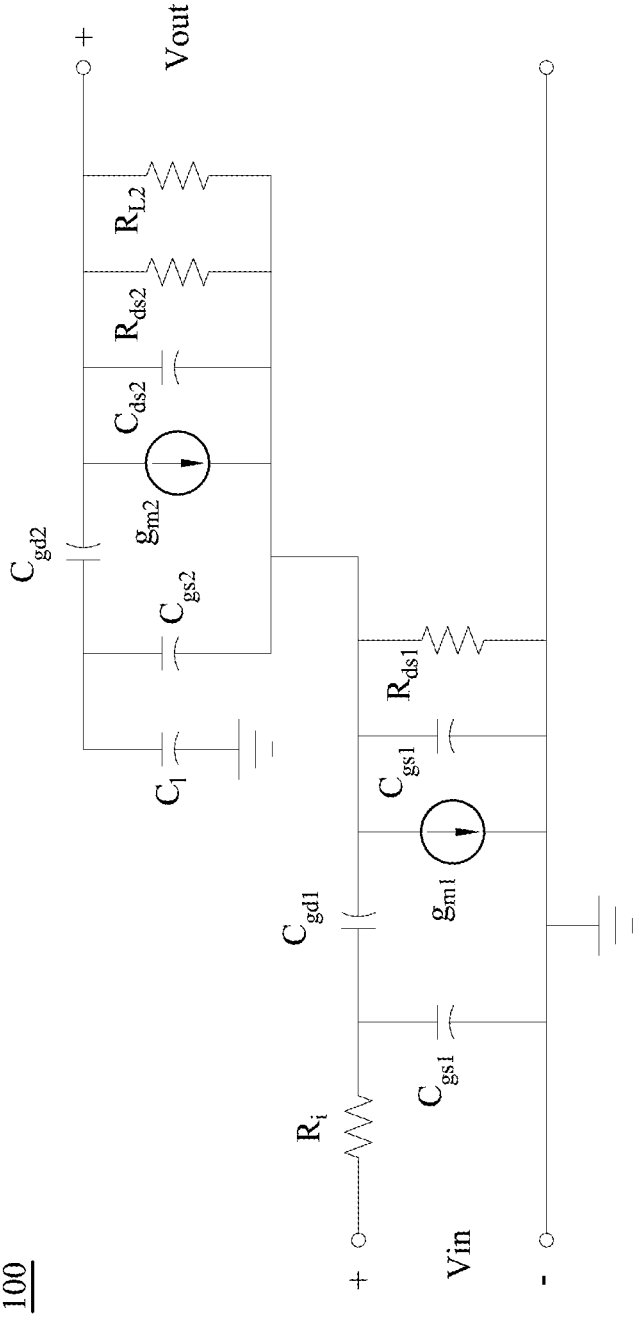
FIG. 2B is a schematic diagram of the equivalent circuit model of the power amplifier in some embodiments of the present disclosure.

FIGS. 2A-2B are circuit diagrams and equivalent model diagrams of the power amplifier 100 in some embodiments of the present disclosure. The power amplifier 100 includes an amplifying circuit 110, a feedback circuit 120 and a grounding capacitor Cg. The amplifying circuit 110 includes a first transistor M1 and a second transistor M2. The control terminal (e.g., gate) of the first transistor M1 is configured to receive an input signal Vin. The first terminal (e.g., source) of the second transistor M2 is coupled to the first transistor M1. The second terminal (e.g., drain) of the second transistor M2 is configured to generate an output signal Vout.

The feedback circuit 120 is coupled to the control terminal of the first transistor M1 and the second terminal of the second transistor M2, so as to form a feedback path. In some embodiments, the feedback circuit 120 is further coupled to the control terminal of the power supply Vd1 and the control terminal of the second transistor M2, and includes multiple impedance elements, such as resistors R1, R2 and inductors L1, L2. In one embodiment, the feedback circuit 120 is respectively coupled to the second terminal (the output terminal of the amplifying circuit 110) of the second transistor M2 and ground terminal through the inductors L1, L2.

The feedback circuit 120 divides the voltage of the power supply Vd1 and the output signal Vout by the impedance elements. In other words, the feedback circuit 120 adjusts the voltage value of the control terminal of the first transistor M1 and/or the second transistor M2 according to the output signal Vout and the supply voltage Vd1.

The grounding capacitor Cg is configured to couple the control terminal (e.g., gate) of the second transistor M2 to ground terminal, and a node of the grounding capacitor Cg coupled to the control terminal of the second transistor M2 is between multiple resistors R1, R2.

The frequency response characteristics of the power amplifier 100 are analyzed here shown in FIGS. 2A and 2B. Using the time constant method to analyze the transfer function of the power amplifier 100, zeros and poles of the power amplifier 100 can be derived. The "pole" corresponds to "frequency value" when the input signal Vin is not zero, but the output signal Vout is infinite. In this embodiment, the frequency response of the power amplifier 100 includes at least two poles. The first pole is close to the DC frequency and has relatively little effect on the high frequency response, and the second pole can be expressed into the following two equations:

$$\omega_{p2\_TW} = \frac{R_i[C_{gs1} + C_{gd1}(1 + g_m R_{L2})] + R'_L(C_{gd1} + C_L)}{R_i R'_L[C_{gs1} C_{gd1} + C_L(C_{gs1} + C_{gd1})]}$$

$$C_L = C_{ds1} + \frac{C_1}{2} - \left[\left(1 + \frac{1}{g_{m2} R_{ds2}}\right)C_{gd2} + C_{ds2}\right]\frac{R_{ds2}(2 - g_{m2} R_{L2})}{8R_{L2}}$$

In the above equations, $\omega_{p2\_TW}$ represents the frequency of the second pole. $R_i$ represents the input impedance of the power amplifier 100. $C_{gs1}$ represents the capacitance between the gate and source of the first transistor M1. $C_{gd1}$ represents the capacitance between the gate and drain of the first transistor M1. $C_{gs2}$ represents the capacitance between the gate and source of the second transistor M2. $C_{gd2}$ represents the capacitance between the gate and drain of the second transistor M2, $g_{m1}$ represents the component gain of the first transistor M1, $g_{m2}$ represents the component gain of the second transistor M2. In this embodiment, it is assumed that the component gain of the first transistor M1 and the second transistor M2 are the same, which are both represented by gm. $R'_L$ represents the ideal value of the output impedance of the power amplifier 100. $R_{L2}$ represents the load impedance of the power amplifier 100. $C_1$ represents the capacitance of the grounding capacitor Cg.

Figure 3A:
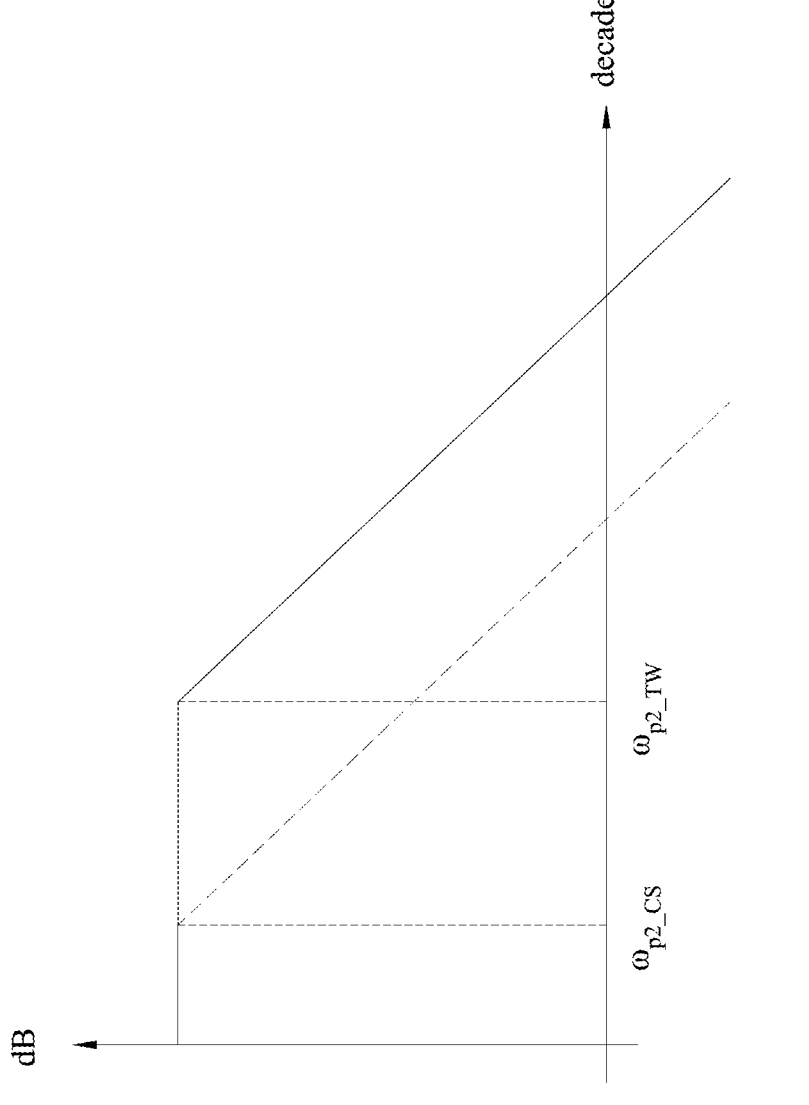
FIGS. 3A-3B are Bode plots of the common source amplifier circuit in some embodiments of the present disclosure.

It can be seen from the above equations that the second pole $\omega_{p2\_TW}$ will affect the capacitance C1 of the grounding capacitor Cg. FIG. 3A is a Bode plot of the power amplifier 100 in some embodiments of the present disclosure. The vertical axis is gain (dB), and the horizontal axis is the decade of the logarithmic scale of the frequency. $\omega_{p2\_CS}$ is the frequency of the second pole of a common source amplifier circuit (i.e., circuit not includes the feedback circuit 120 and the grounding capacitor Cg), and the corresponding frequency is about 25.3 GHz. $\omega_{p2\_TW}$ is the second pole of the power amplifier 100 shown in FIG. 2A, and the corresponding frequency is about 48.9 GHz. It can be seen from the figures that the feedback circuit 120 and the grounding capacitor Cg can significantly increase the frequency of the second pole, and the gain of the power amplifier 100 remains the same in the frequency bandwidth. Since the bandwidth of the power amplifier 100 depends on the two poles, when the second pole $\omega_{p2\_TW}$ increases, the bandwidth of the power amplifier 100 also increases. In other words, the capacitance of the grounding capacitor Cg will also affect the bandwidth of the power amplifier 100.

Figure 3B:
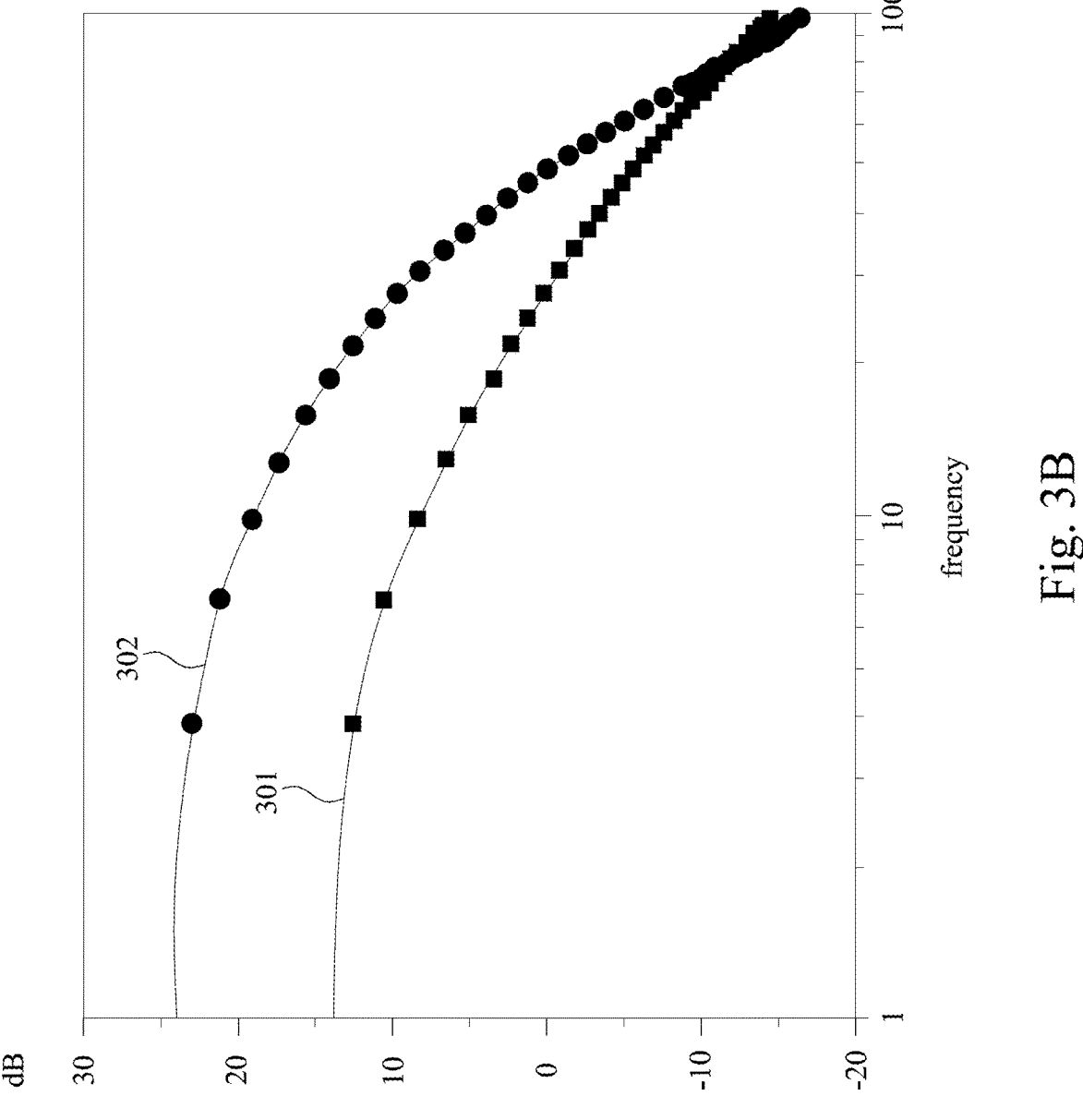

As mentioned above, FIG. 3B is a Bode plot of the power amplifier 100 in some embodiments of the present disclosure. The vertical axis is gain (dB), and the horizontal axis is frequency. The characteristic line 301 is the Bode plot of the common source amplifier circuit. The characteristic line 302 is the Bode plot of the power amplifier 100 (including the feedback circuit 120 and the grounding capacitor Cg) shown in FIG. 2A. Comparing the two characteristic lines 301 and 302, it can be seen that the feedback circuit 120 and the grounding capacitor Cg can effectively reduce the problem of high frequency gain declines sharply.

In one embodiment, if the power amplifier 100 is applied to a dual-frequency amplifier of 28/38 GHz, the maximum available gain (MAG) of the element can be expressed as the following equation:

$$MAG = \frac{|S_{21}|}{|S_{12}|}\Delta$$

$$\Delta = k - \sqrt{k^2 - 1}, k \geq 1$$

Figure 4B:
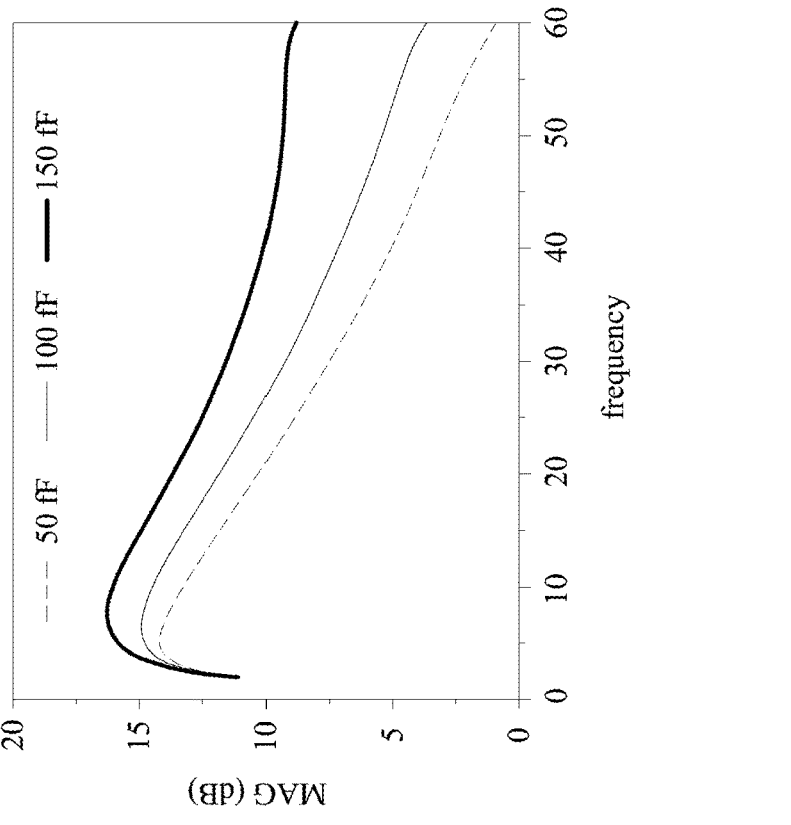
FIGS. 4A-4B are schematic diagrams of the maximum available gain (MAG) and stability factor corresponding to different capacitance values of the grounding capacitor in some embodiments of the present disclosure.
Figure 4A:
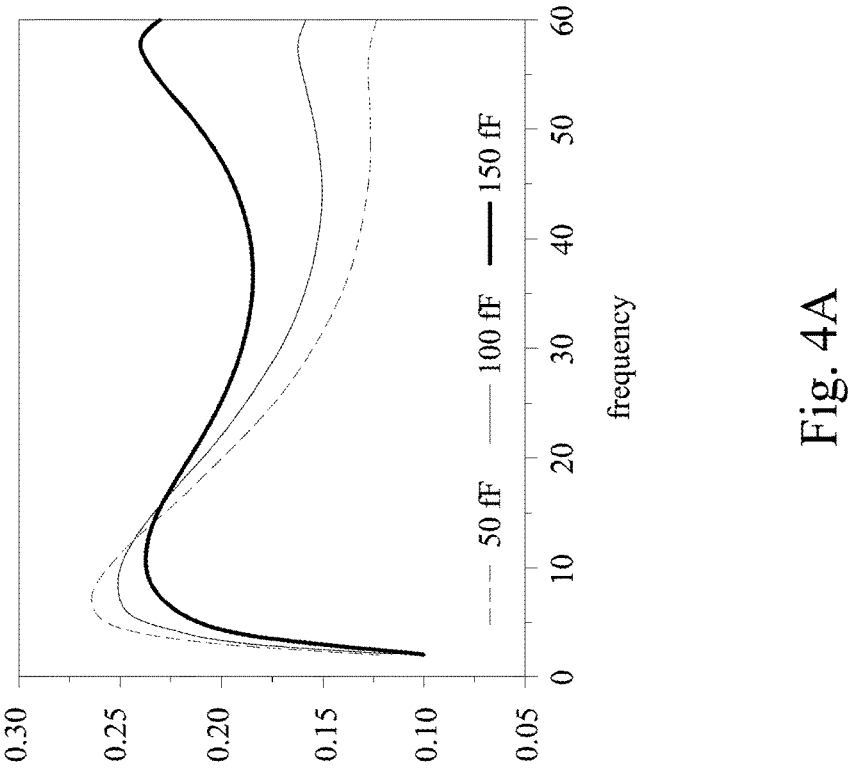

In aforementioned equation, $S_{12}$, $S_{21}$ are the reflection coefficients of the power amplifier 100, k is the stability factor of the power amplifier 100, and $\Delta$ is stability coefficient. By analyzing the common source amplifier circuit and the power amplifier 100 of this embodiment, it can be seen that the decline trend of the maximum available gain (MAG) is similar to the decline trend of the reflection coefficients S12 and S21. Therefore, the stability factor A can significantly affect the decline trend of the maximum available gain (MAG), and adjusting the capacitance of the grounding capacitor Cg will change the trend of the stability coefficient A. FIGS. 4A-4B are schematic diagrams of the maximum available gain (MAG) and stability factor A corresponding to different capacitance values of the grounding capacitor Cg. It can be seen from the figure that, in one embodiment, when the capacitance of the grounding capacitor C1 is 150 nF, the decline trend of the maximum available gain (MAG) is more moderate.

According to the above analysis and embodiments, the present disclosure uses the grounding capacitor to improve the high frequency response characteristics of the device, so as to break through the operating frequency limitation of the device process technology.

FIGS. 5A-5D are schematic diagrams of the optimal output impedances of the power amplifier 100 for maximum output power at different frequencies. FIG. 5A shows the optimal distribution of the output impedance of the common source amplifier circuit. FIG. 5B shows the optimal distribution of the output impedance when the grounding capacitor of the power amplifier 100 is 50 fF. FIG. 5C shows the optimal distribution of the output impedance when the grounding capacitor of the power amplifier 100 is 150 fF. FIG. 5D shows the optimal distribution of the output impedance when the grounding capacitor of the power amplifier 100 is 250 fF. In FIGS. 5A-5D, the power points P1-P3 are positions of the optimal output power in the first band (e.g., 27-29 GHz). The power points P4-P6 are positions of the optimal output power in the first band (e.g., 37-39 GHz). Each circle in FIGS. 5A-5D represents the same output power, and the output power difference between different circles is 20 dB. Therefore, the closer each circle is, the less loss of the power amplifier 100 when processing signals of multiple frequency bands at the same time. It can be seen from the figures that the capacitance of the grounding capacitor Cg can affect the discrete degree of "the output impedance distribution" of the power amplifier between different frequency bands. For example, in this embodiment, the output efficiency is optimal when the capacitance of the grounding capacitor Cg is 150 fF. In other words, the power amplifier 100 provided by the present disclosure can improve the output efficiency of dual-frequency/multi-frequency amplifiers for high frequency applications, remain the conversion efficiency of the amplifier and improve energy usage.

Figure 6:
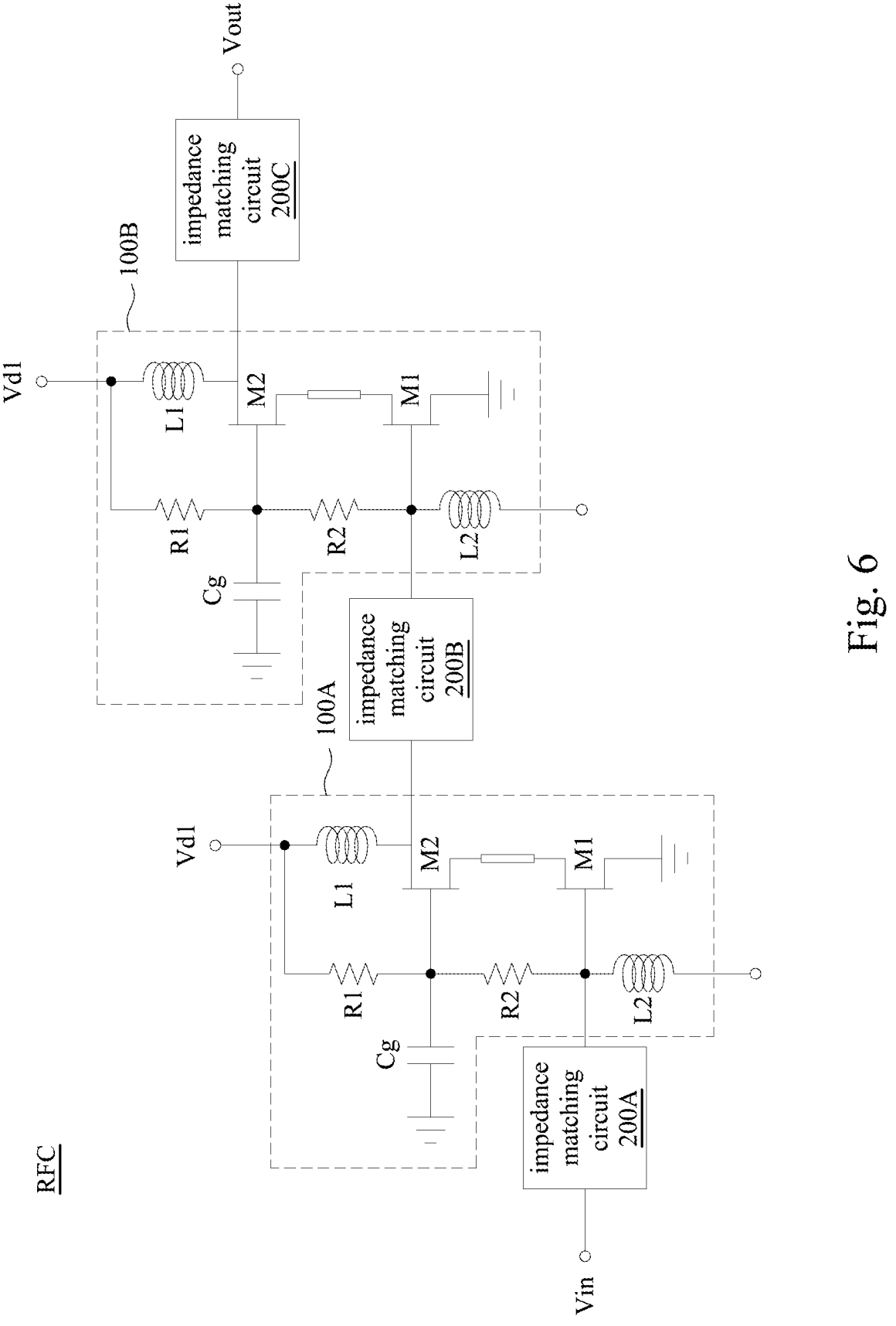
FIG. 6 is a schematic diagram of the radio frequency front-end circuit in some embodiments of the present disclosure.

FIG. 6 is a schematic diagram of the radio frequency front-end circuit RFC in some embodiments of the present disclosure. In FIG. 6, the similar components associated with the embodiment of FIG. 1 and FIG. 2A are labeled with the same numerals for ease of understanding. The specific principle of the similar component has been explained in detail in the previous paragraphs, and unless it has a cooperative relationship with the components of FIG. 6, it is not repeated here.

As shown in FIG. 6, the radio frequency front-end circuit RFC includes a power amplifier 100A of the driver stage, a power amplifier 100B of the power stage, and multiple impedance matching circuits 200A-200C. The circuit structure of the power amplifiers 100A, 100B has been described in the foregoing embodiments, so it will not be repeated here. The impedance matching circuits 200A-200C are coupled to the input terminal or the output terminal of the power amplifiers 100A, 100B, respectively. The impedance matching circuit 200A is configured to transmit the input signal Vin to the power amplifier 100A. The impedance matching circuit 200B is configured to output signal generated by the power amplifier 100A to the power amplifier 1008. The impedance matching circuit 200C is configured to receive the output signal Vout generated by the power amplifier 1008.

As mentioned above, the impedance matching circuit 200A-200C is configured to adjust the input impedance or the output impedance of the power amplifiers 100A, 1008, so as to avoid affecting the output power of the power amplifiers 100A-100B due to impedance mismatch between circuits. For example, the output impedance of the impedance matching circuit 200A and the input impedance of the power amplifier 100A are substantially the same. The impedances at two terminals of the impedance matching circuit 200B are substantially equal to the output impedance of the power amplifier 100A and the input impedance of the power amplifier 1008, respectively. The input impedance of the impedance matching circuit 200C and the output impedance of the power amplifier 1008 are substantially the same.

The present disclosure adds the grounding capacitor C1 to "the semiconductor component side of the power amplifier" to reduce the gain decline in the high frequency response. Therefore, after the maximum available gain (MAG) of "semiconductor component side" is improved, the impedance matching circuit in the radio frequency front-end circuit will be easier to design. There is no need to add complex auxiliary circuits in order to increase the maximum available gain (MAG), so the overall volume and cost of the radio frequency front-end circuit can be effectively controlled.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A power amplifier, comprising:
an amplifying circuit at least comprising a first transistor and a second transistor, wherein a control terminal of the first transistor is configured to receive an input signal, a first terminal of the second transistor is coupled to the first transistor, and a second terminal of the second transistor is configured to generate an output signal;
a feedback circuit coupled to the control terminal of the first transistor and the second terminal of the second transistor, wherein the feedback circuit comprises a plurality of impedance elements, and one of the plurality of impedance elements is directly electrically connected to a control terminal of the second transistor and the control terminal of the first transistor, and no active component is electrically connected to the control terminal of the second transistor and the control terminal of the first transistor; and
a grounding capacitor configured to couple the control terminal of the second transistor to a ground terminal, wherein when a frequency of the input signal is between a first band and a second band, an amplification gain of the output signal relative to the input signal is substantially the same.

2. The power amplifier of claim 1, wherein the feedback circuit is configured to adjust a voltage value of the control terminal of the first transistor and a voltage value of the control terminal of the second transistor according to the output signal and a supply voltage.

3. The power amplifier of claim 1, wherein the plurality of impedance elements is configured to divide a supply voltage to control a voltage value of the control terminal of the first transistor.

4. The power amplifier of claim 3, wherein a node of the grounding capacitor coupled to the control terminal of the second transistor is between the plurality of impedance elements.

5. The power amplifier of claim 1, wherein the feedback circuit is coupled to the second terminal of the second transistor through an inductor.

6. A power amplifier, comprising:
an amplifying circuit at least comprising a first transistor and a second transistor, wherein a control terminal of the first transistor is configured to receive a input signal, a first terminal of the second transistor is coupled to the first transistor, and a second terminal of the second transistor is configured to generate an output signal;
a feedback circuit coupled to the control terminal of the first transistor and the second terminal of the second transistor, wherein the feedback circuit comprises a plurality of impedance elements, and one of the plurality of impedance elements is electrically connected to a control terminal of the second transistor and the control terminal of the first transistor, and no active component is electrically connected to the control terminal of the second transistor and the control terminal of the first transistor; and
a grounding capacitor configured to couple the second transistor to a ground terminal, and to couple the feedback circuit to the ground terminal, wherein when a frequency of the input signal is between a first band and a second band, an amplification gain of the output signal relative to the input signal is substantially the same.

7. The power amplifier of claim 6, wherein the feedback circuit is configured to adjust a voltage value of the control terminal of the first transistor and a voltage value of the control terminal of the second transistor according to the output signal and a supply voltage.

8. The power amplifier of claim 6, wherein the plurality of impedance elements is configured to divide a supply voltage to control a voltage value of the control terminal of the first transistor.

9. The power amplifier of claim 8, wherein a node of the grounding capacitor coupled to the control terminal of the second transistor is between the plurality of impedance elements.

10. The power amplifier of claim 6, wherein the feedback circuit is coupled to the second terminal of the second transistor through an inductor.

11. A radio frequency front-end circuit, comprising:
a power amplifier, comprising:
an amplifying circuit at least comprising a first transistor and a second transistor, wherein a control terminal of the first transistor is configured to receive an input signal, a first terminal of the second transistor is coupled to the first transistor, and a second terminal of the second transistor is configured to generate an output signal;

a feedback circuit coupled to the control terminal of the first transistor and the second terminal of the second transistor, wherein the feedback circuit comprises a plurality of impedance elements, and one of the plurality of impedance elements is directly electrically connected to a control terminal of the second transistor and the control terminal of the first transistor, and no active component is electrically connected to the control terminal of the second transistor and the control terminal of the first transistor; and a grounding capacitor configured to couple the control terminal of the second transistor to a ground terminal, wherein when a frequency of the input signal is between a first band and a second band, an amplification gain of the output signal relative to the input signal is substantially the same; and an impedance matching circuit coupled to the power amplifier, and configured to transmit an input signal to the amplifying circuit, wherein an output impedance of the impedance matching circuit is substantially the same as an input impedance of the power amplifier.

12. The radio frequency front-end circuit of claim 11, wherein the feedback circuit is configured to adjust a voltage value of the control terminal of the first transistor and a voltage value of the control terminal of the second transistor according to the output signal and a supply voltage.

13. The radio frequency front-end circuit of claim 11, wherein the plurality of impedance elements is configured to divide a supply voltage to control a voltage value of the control terminal of the first transistor.

14. The radio frequency front-end circuit of claim 13, wherein a node of the grounding capacitor coupled to the control terminal of the second transistor is between the plurality of impedance elements.

15. The radio frequency front-end circuit of claim 11, wherein the feedback circuit is coupled to the second terminal of the second transistor through an inductor.

* * * * *